US006940562B2

(12) United States Patent
Sato

(10) Patent No.: US 6,940,562 B2
(45) Date of Patent: Sep. 6, 2005

(54) CONTROLLER FOR REMOTELY CONTROLLING TWO OR MORE CONTROLLED DEVICES

(75) Inventor: Keiji Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 09/836,475

(22) Filed: Apr. 18, 2001

(65) Prior Publication Data

US 2002/0047944 A1 Apr. 25, 2002

(30) Foreign Application Priority Data

Apr. 20, 2000 (JP) ....................................... 2000-119025
Apr. 20, 2000 (JP) ....................................... 2000-119028

(51) Int. Cl.[7] ........................... H04N 5/232; H04N 5/44

(52) U.S. Cl. .................... 348/734; 348/552; 348/14.05; 725/153; 340/825.72

(58) Field of Search ................................ 348/734, 725, 348/723, 706, 552, 553, 14.05, 14.04; 455/352, 92; 381/315, 105; 340/825.69, 825.22, 825.72; 725/93, 116, 133, 153

(56) References Cited

U.S. PATENT DOCUMENTS

| | | | | | |
|---|---|---|---|---|---|
| 5,151,910 | A | | 9/1992 | Inuyama et al. | 372/31 |
| 5,341,166 | A | * | 8/1994 | Garr et al. | 725/153 |
| 5,416,535 | A | * | 5/1995 | Sato et al. | 348/706 |
| 5,418,527 | A | * | 5/1995 | Yashiro | 340/825.24 |
| 5,511,161 | A | | 4/1996 | Sato et al. | 395/575 |
| 6,021,185 | A | * | 2/2000 | Staron | 379/93.17 |
| 6,115,034 | A | | 9/2000 | Tanaka et al. | 707/103 |
| 6,396,549 | B1 | * | 5/2002 | Weber | 348/734 |
| 6,400,280 | B1 | * | 6/2002 | Osakabe | 340/825.25 |
| 6,412,076 | B1 | * | 6/2002 | Honda et al. | 713/323 |
| 6,469,633 | B1 | * | 10/2002 | Wachter | 340/825.69 |

* cited by examiner

*Primary Examiner*—Michael H. Lee
*Assistant Examiner*—Jean W. Désir
(74) *Attorney, Agent, or Firm*—Fitzpatrick, Cella, Harper & Scinto

(57) ABSTRACT

The present invention provides for controlling a controlled apparatus, which is controlled by a remote control signal. The remote control signal transmitted from a remote control apparatus is received, and the controlled apparatus or a second controlled apparatus is selected according to the remote control signal. A control command corresponding to the remote control signal is transmitted to the second controlled apparatus, if the second controlled apparatus is selected. An operating state of the second controlled apparatus is checked before the control command is transmitted to the second controlled apparatus. The controlled apparatus is controlled according to the remote control signal, if the controlled apparatus is selected.

15 Claims, 20 Drawing Sheets

CONTROLLER FOR REMOTELY CONTROLLING TWO OR MORE CONTROLLED DEVICES

BACKGROUND OF THE INVENTION

1. Field of the Invention

The present invention relates to a system in which two or more pieces of electronic equipment are remotely controlled by a remote controller.

2. Related Background Art

FIG. 24 is a diagram for explaining an example of a conventional remote control system. The system includes a digital videotape recorder (hereinbelow, called the VTR) 210 and a TV monitor 212. A video cable 214 connects the video-output terminal of the VTR 210 to the video-input terminal of the TV monitor 212. An audio cable 216 connects the audio-output terminal of the VTR 210 to the audio-input terminal of the TV monitor 212.

A remote controller 218 for remote operation of the VTR 210 is equipped with an infrared transmitter 220. The VTR 210 is equipped with an infrared receiver 222, which receives a remote control signal output from the infrared transmitter 220 of the remote controller 218.

Reference numeral 224 denotes a digital video camera-recorder combination (hereinbelow, called the camcorder). A remote controller 226 is used to remotely operate the camcorder 224; it is equipped with an infrared transmitter 228. The camcorder 224 is equipped with an infrared receiver 230, which receives a remote control signal output from the infrared transmitter 228 of the remote controller 226.

The VTR 210 and the camcorder 224 are provided with digital interfaces, both of which are based on the IEEE 1394-1995 standard and connected to each other through an IEEE 1394 cable 232.

Suppose here that a user reproduces video and audio signals prerecorded on a vide tape of the VTR 210 to tape them on a vide tape of the camcorder 224. In this case, the user uses the remote controller 218 to set the VTR 210 in a reproduction mode. Then, after checking images (and sounds) on the TV monitor 212, the user uses the remote controller 226 to set the camcorder 224 in a recording mode. Thus the vide and audio signals reproduced from the videotape of the VTR 210 are recorded on the videotape of the camcorder 224.

The conventional system, however, needs to provide the remote controller 218 for control of the VTR 210 and the remote controller 226 for control of the camcorder 224, respectively. In other words, a separate remote controller needs to be provided for each piece of electronic equipment that constitutes the system. The problem in the conventional system is that the user has to manage two or more remote controllers.

Suppose further that the user has lost a remote controller corresponding to a desired piece of electronic equipment. In this case, the desired piece of electronic equipment cannot be remotely operated until the user finds the remote controller.

SUMMARY OF THE INVNETION

It is an object of the present invention to provide a system in which a remote controller enables a user to remotely operate two or more pieces of electronic equipment.

In one aspect, the present invention provides for controlling a controlled apparatus, which is controlled by a remote control signal. The remote control signal transmitted from a remote control apparatus is received, and the controlled apparatus or a second controlled apparatus is selected according to the remote control signal. A control command corresponding to the remote control signal is transmitted to the second controlled apparatus, if the second controlled apparatus is selected. An operating state of the second controlled apparatus is checked before the control command is transmitted to the second controlled apparatus. The controlled apparatus is controlled according to the remote control signal, if the controlled apparatus is selected.

Preferably, the remote control apparatus has a selector adapted to select a destination of the control command. It is also preferred that the remote control signal has information indicating a destination of the control command. The controlled apparatus may be an apparatus having a video recorder, or may be an apparatus having a TV monitor.

This brief summary has been provided so that the nature of the invention may be understood quickly. A more complete understanding of the invention can be obtained by reference to the following detailed description of the preferred embodiment thereof in connection with the attached drawings.

DESCRIPTION OF THE PREFERRED EMBODIMENTS

The preferred embodiments of the present invention will now be described in detail hereinafter with reference to the accompanying drawings.

First Embodiment

Figure 1:
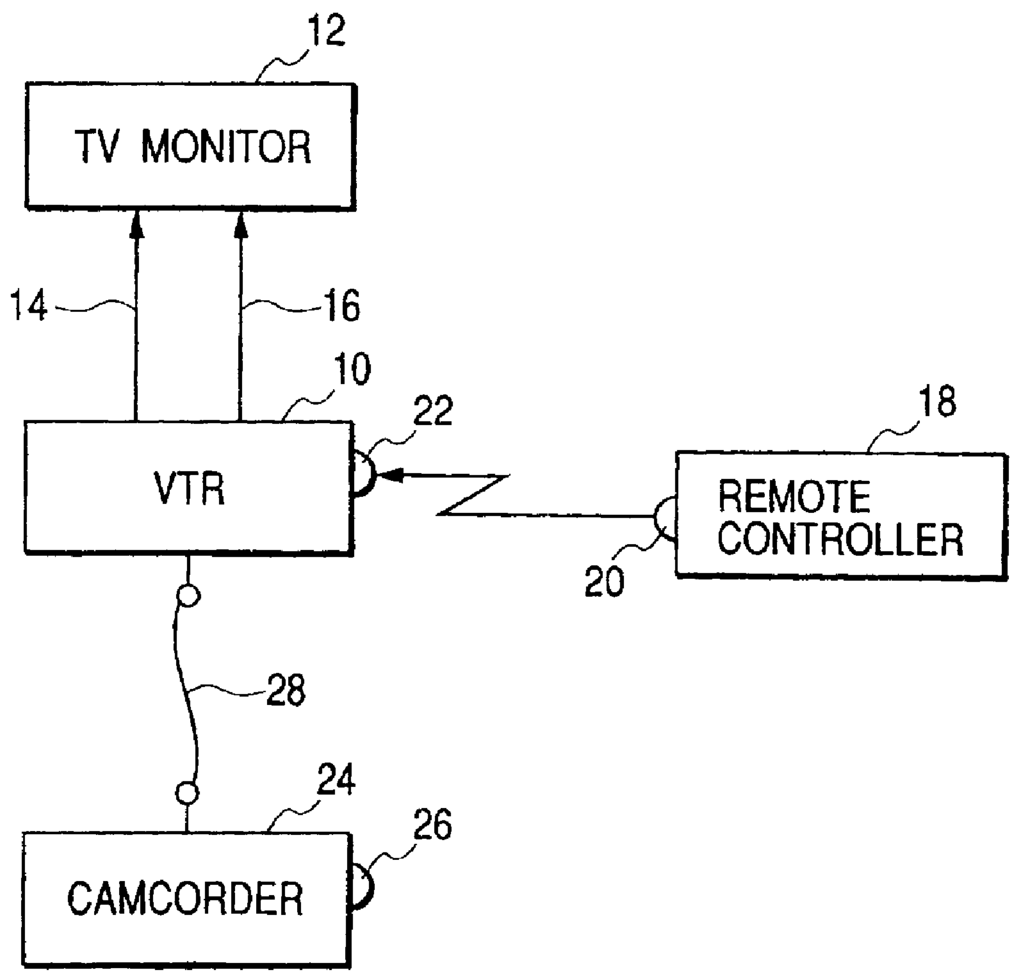
FIG. 1 is a block diagram for explaining a configuration of a remote control system according to a first embodiment.

FIG. 1 is a block diagram for explaining a configuration of a remote control system according to the first embodiment. The system includes a digital videotape recorder (hereinbelow, called the VTR) 10 and a TV monitor 12. The TV monitor 12 includes a display for displaying video signals and a speaker for outputting audio signals. A video cable 14 connects the video-output terminal of the VTR 10 to the video-input terminal of the TV monitor 12. An audio cable 16 connects the audio-output terminal of the VTR 10 to the audio-input terminal of the TV monitor 12.

A remote controller 18 for remote operation of the VTR 10 is equipped with an infrared transmitter 20. The VTR 10 is equipped with an infrared receiver 22, which receives a remote control signal output from the infrared transmitter 20 of the VTR 10.

A digital video camera-recorder combination (hereinbelow, called the camcorder) 24 is equipped with an infrared receiver 26, which receives a remote control signal from a remote controller, not shown. It should be noted that the infrared receiver 26 is not used in this embodiment.

The VTR 10 and the camcorder 24 are provided with digital interfaces, both of which are based on the IEEE 1394-1995 standard and connected to each other through an IEEE 1394 cable 28.

Figure 2:
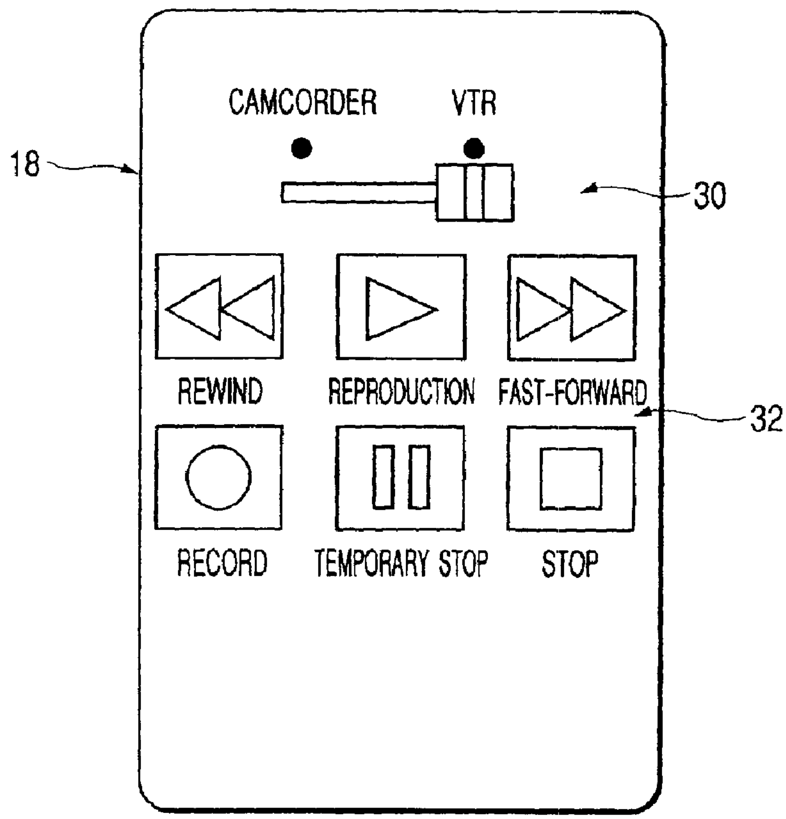
FIG. 2 is a diagram showing an example of a remote controller 18.

FIG. 2 is a diagram showing an example of the remote controller 18. A switch 30 is used to specify a target to be controlled. The remote controller 18 according to the first embodiment can select either the VTR 10 or the camcorder 24 as the controlled target. VTR operation keys 32 are commonly used to remotely operate VTR units provided in the VTR 10 and the camcorder 24, respectively.

Figure 3A:
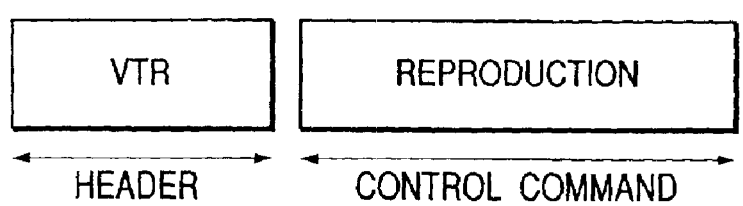
FIGS. 3A and 3B are diagrams for explaining examples of remote control signals output from the remote controller 18 when a user operates a reproduction key in VTR operation keys 32.
Figure 3B:
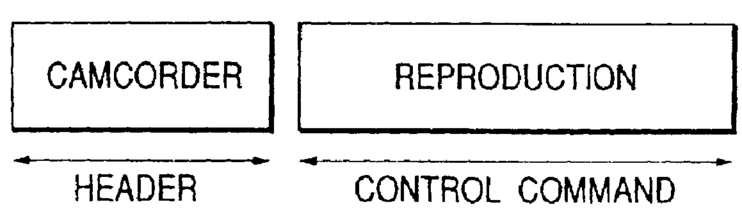

FIGS. 3A and 3B are diagrams for explaining examples of remote control signals output from the remote controller 18 when a user operates a reproduction key in the VTR operation keys 32. If the VTR 10 is selected by the switch 30, the remote controller 18 outputs a remote control signal (including a header that specifies the VTR 10 as the controlled target and control data that direct reproduction operations as the controlled contents) as shown in FIG. 3A. On the other hand, if the camcorder 24 is selected by the switch 30, the remote controller 18 outputs a remote control signal (including a header that specifies the camcorder 24 as the controlled target and control data that direct reproduction operations as the controlled contents) as shown in FIG. 3B.

Figure 4:
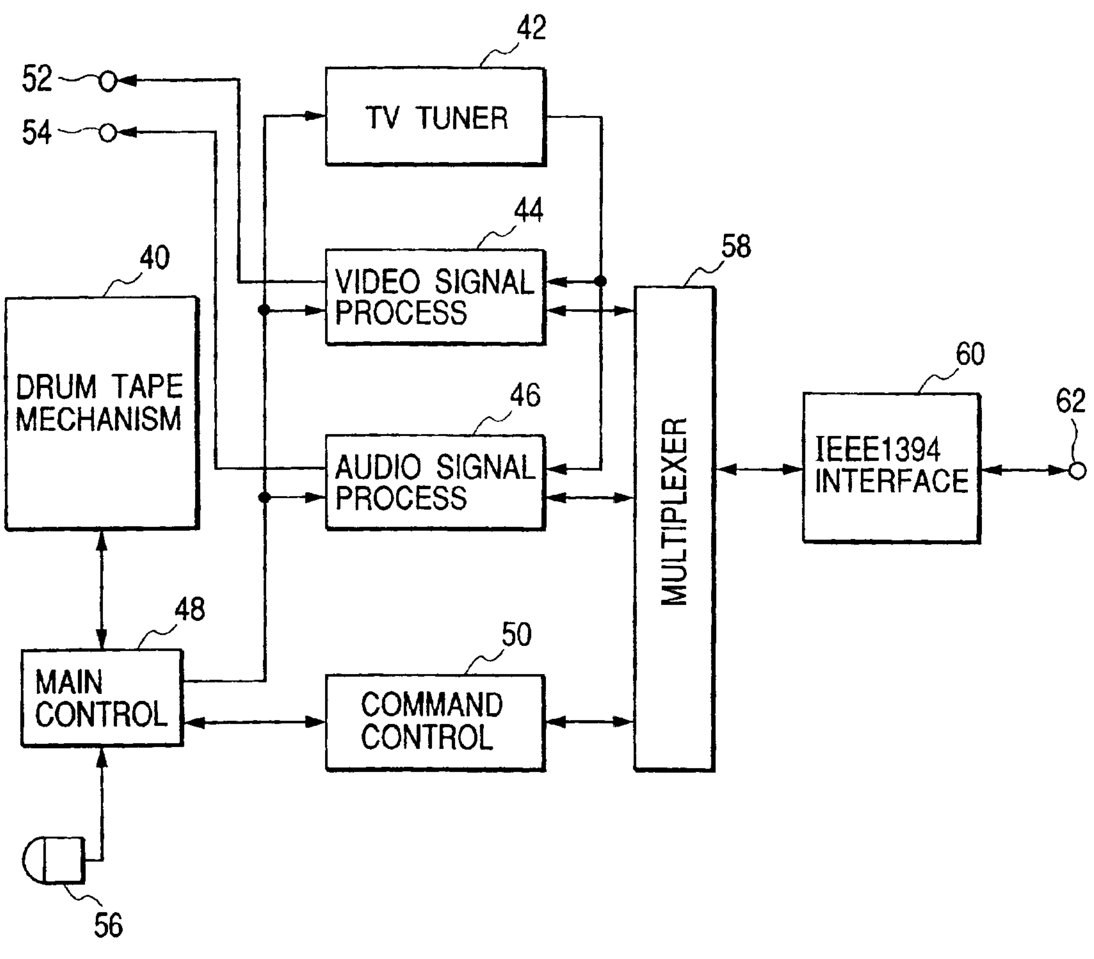
FIG. 4 is a block diagram for explaining major components of a VTR 10.

FIG. 4 is a block diagram for explaining major components of the VTR 10. The major components include a drum-tape mechanism 40 for a rotary drum and a magnetic tape, a TV tuner 42, a video signal processing circuit 44, and an audio signal processing circuit 46. A main control circuit 48 (including a microcomputer) controls the entire system of the VTR 10 including the drum-tape mechanism 40, the TV tuner 42, the video signal processing circuit 44 and the audio signal processing circuit 46. A command control circuit 50 processes control commands sent to or received from external equipment; it also communicates with the main control circuit 48.

Reference numeral 52 denotes an output terminal from which a video signal processed in the video signal processing circuit 44 is output. Reference numeral 54 denotes an output terminal from which an audio signal processed in the audio signal processing circuit 46 is output. An infrared receiver 56 receives a remote control signal transmitted from the remote controller 18 and supplies the same to the main control circuit 48.

A multiplexer 58 performs time-division multiplexing and demultiplexing of a video signal packet, an audio signal packet and a command packet according to an IEEE 1394 communication protocol. A digital interface 60, which is based on the IEEE 1394-1995 standard and hereinbelow called the IEEE 1394 interface, is equipped with a terminal 62.

Figure 5:
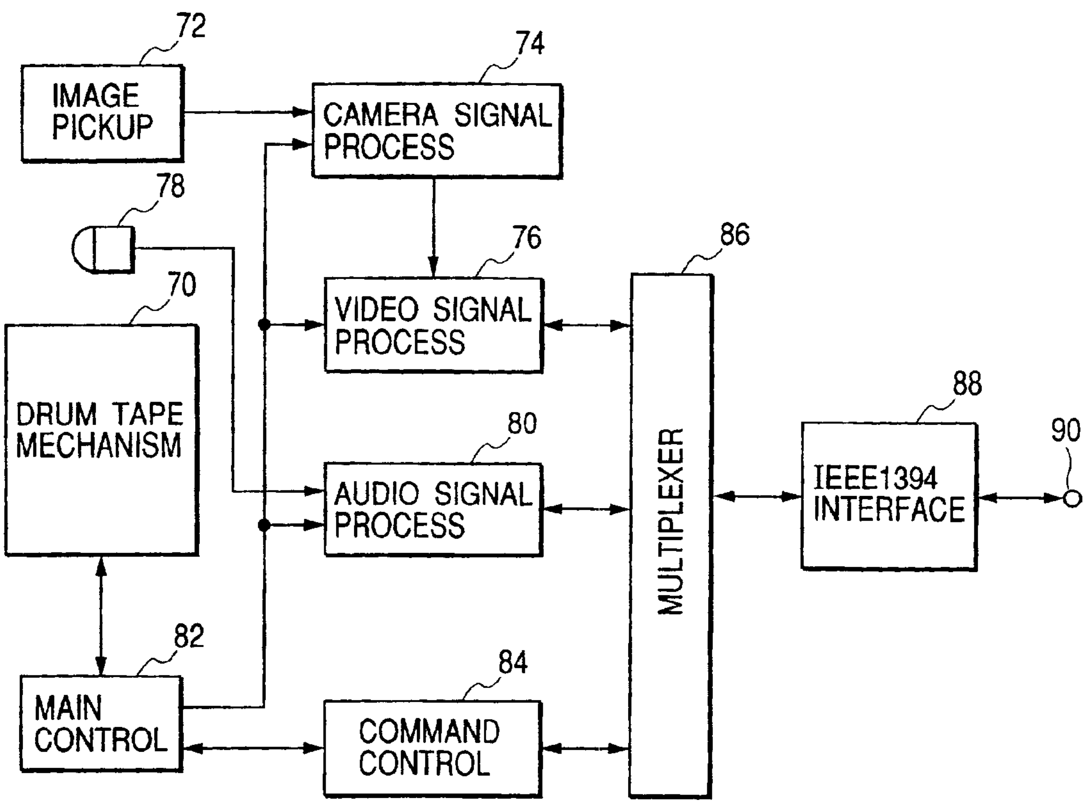
FIG. 5 is a block diagram for explaining major components of a camcorder 24.

FIG. 5 is a block diagram for explaining major components of the camcorder 24. The major components include: a drum-tape mechanism 70 for a rotary drum and a magnetic tape; an image pickup part 72, which is composed of a taking lens and an image pickup device; a camera signal processing circuit 74, which processes an image signal output from the image pickup part 72; a video signal processing circuit 76; a microphone 78; and an audio signal processing circuit 80. A main control circuit 82 (including a microcomputer) controls the entire system of the camcorder 24 including the drum-tape mechanism 70, the camera signal processing circuit 74, the video signal processing circuit 76 and the audio signal processing circuit 80. A command control circuit 84 processes control commands sent to or received from external equipment; it also communicates with the main control circuit 82.

A multiplexer 86 performs time-division multiplexing and demultiplexing of a video signal packet, an audio signal packet and a command packet according to an IEEE 1394 communication protocol. A digital interface 88, which is based on the IEEE 1394-1995 standard and hereinbelow called the IEEE1394 interface, is equipped with a terminal 90.

The terminal 62 of FIG. 4 and the terminal 90 of FIG. 5 are connected through the IEEE 1394 cable 28, which enables the VTR 10 and the camcorder 24 to communicate with each other, and hence to exchange video signals, audio signals and control commands.

Figure 6:
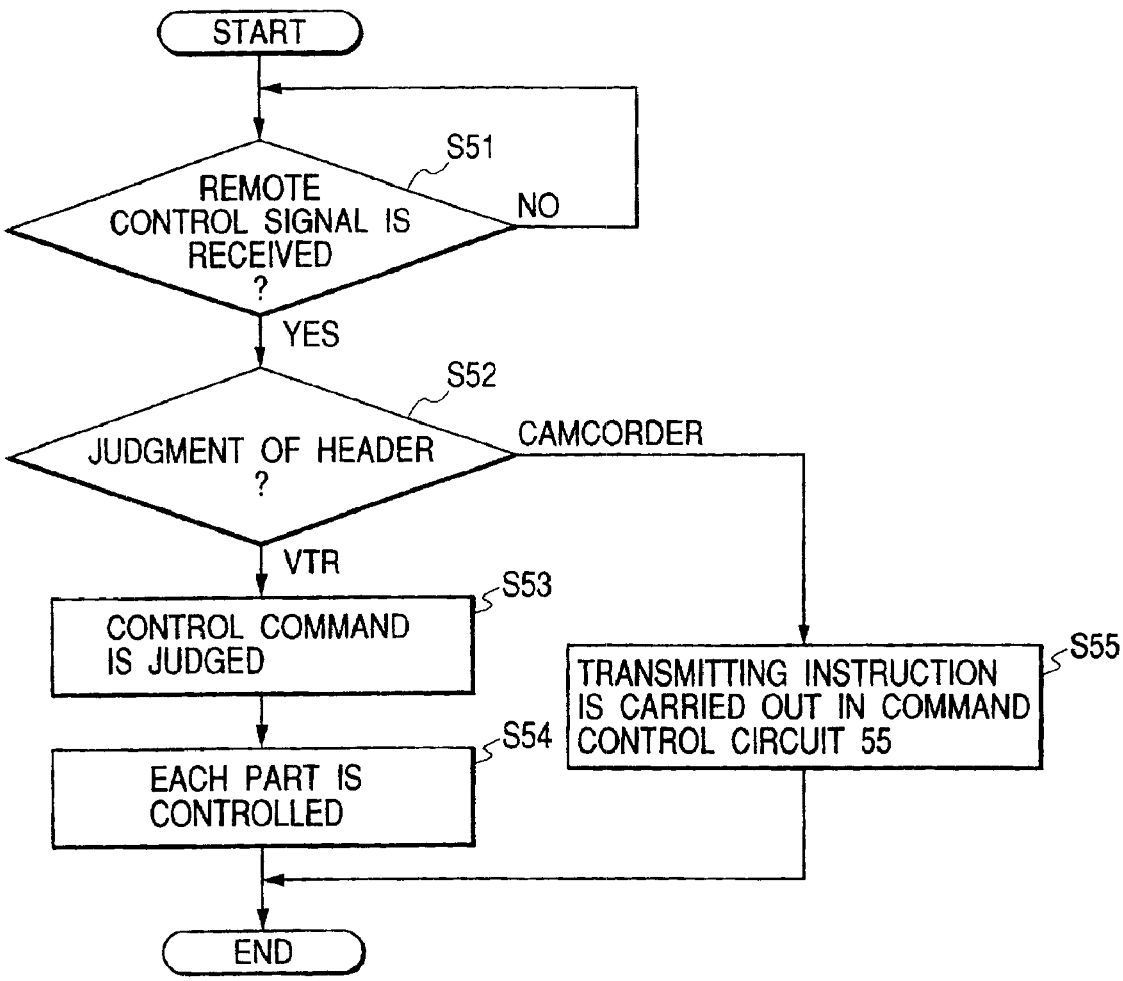
FIG. 6 is a flowchart for explaining he major operation of a main control circuit 48.

FIG. 6 is a flowchart for explaining the major operation of the main control circuit 48. The main control circuit 48 monitors an output signal from the infrared receiver 56 and stands by until a remote control signal is received (S51). Upon receipt of the remote control signal from the remote controller 18, the main control circuit 48 judges the header included in the remote control signal as to whether the controlled target is itself (i.e., the VTR 10) or other equipment (i.e., the camcorder 24) (S52). If the controlled target is itself (S52), the main control circuit 48 judges the contents of a control command (S53) and controls each component to operate according to the contents of the control command (S54). On the other hand, if the controlled target is other equipment (S52), the main control circuit 48 commands the command control circuit 50 to transmit the control command to the controlled target through the IEEE 1394 interface 60 (S55).

Figure 7:
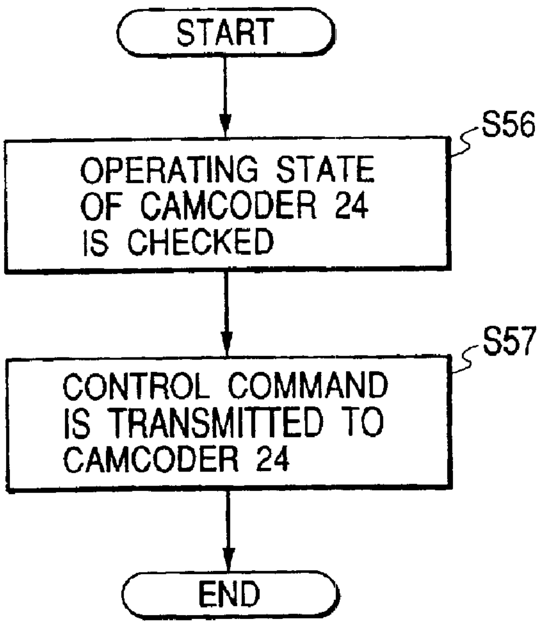
FIG. 7 is a flowchart for explaining the operation of a command control circuit 50 executed in step S55 of FIG. 6.

FIG. 7 is a flowchart for explaining the operation of the command control circuit 50 executed in step S55 of FIG. 6. The command control circuit 50 first checks an operating state of the camcorder 24 as the controlled target (S56). If it is judged from the checked operating state that the control command can be transmitted to the camcorder 24, the command control circuit 50 immediately starts transmitting the control command to the camcorder 24 (S57).

Figure 8:
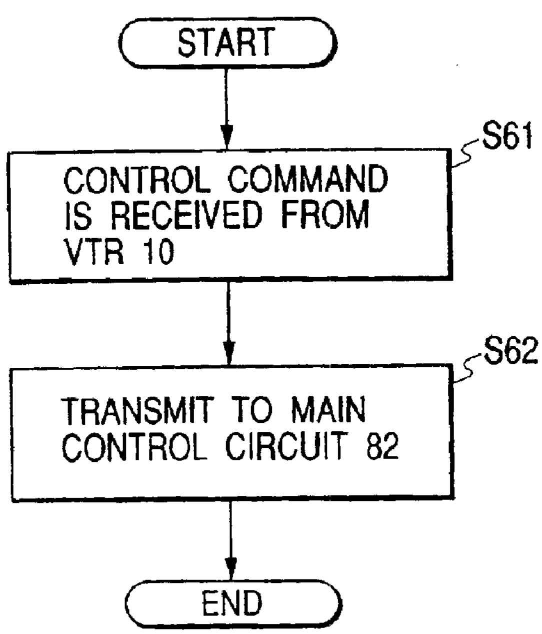
FIG. 8 is a flowchart for explaining the major operation of a command control circuit 84.

FIG. 8 is a flowchart for explaining the major operation of the command control circuit 84 of the camcorder 24. The command control circuit 84 receives the control command from the VTR 10 through the IEEE 1394 interface 88 (S61) and transmits the same to the main control circuit 82 (S62). The main control circuit 82 controls each component according to the control command transmitted from the VTR 10.

As described above, according to the first embodiment, the VTR 10 judges a controlled target on the basis of the header information of the remote control signal transmitted from the remote controller 18. If the controlled target is itself, the VTR 10 operates according to the control command of the remote control signal. If the controlled target is other equipment, the VIR 10 forwards to the equipment the control command of the remote control signal. Such a configuration makes it easy for a user to remotely operate two or more pieces of equipment using the single remote controller 18.

Second Embodiment

Figure 9:
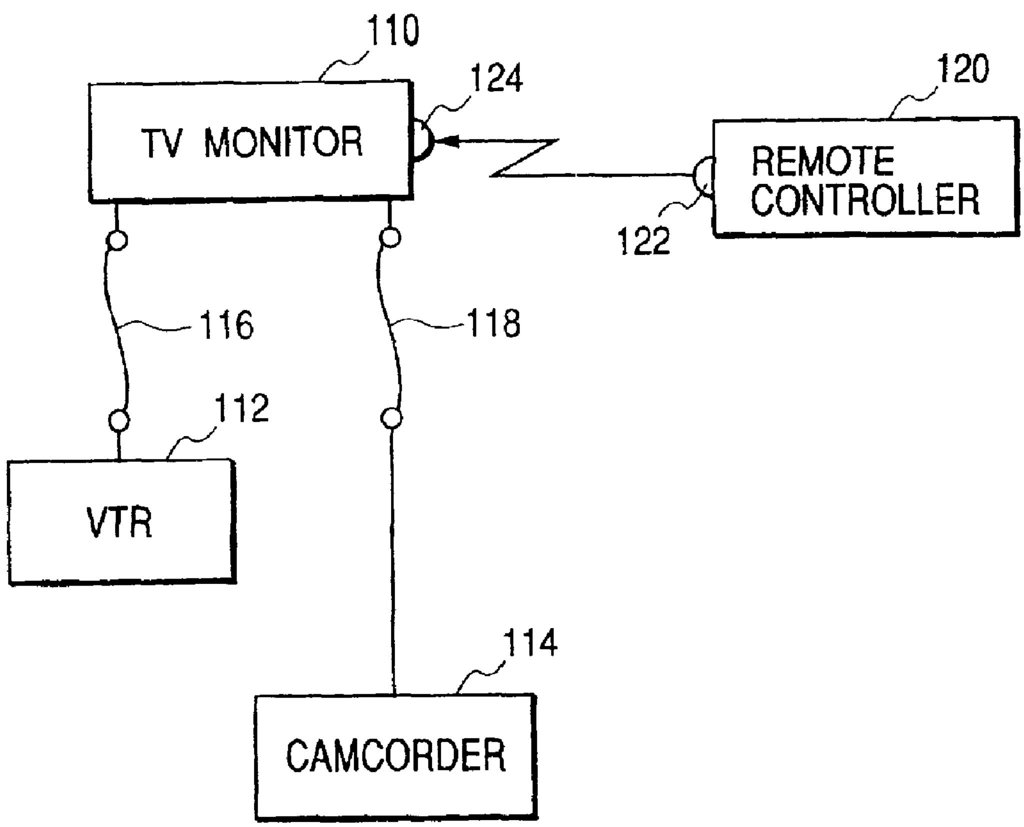
FIG. 9 is a block diagram for explaining a configuration of a remote control system according to a second embodiment.

FIG. 9 is a block diagram for explaining a configuration of a remote control system according to the second embodiment. According to the second embodiment, a TV monitor 110, a digital videotape recorder (hereinbelow, called the VTR) 112, and a digital video camera-recorder combination (hereinbelow, called the camcorder) 114 are provided with digital interfaces, respectively, all of which are based on the IEEE 1394-1995 standard. These pieces of equipment are connected through IEEE 1394 cables 116 and 118. A remote controller 120 is equipped with an infrared transmitter 122, while the TV monitor 110 is equipped with an infrared receiver 124 corresponding to the infrared transmitter 122.

Figure 10:
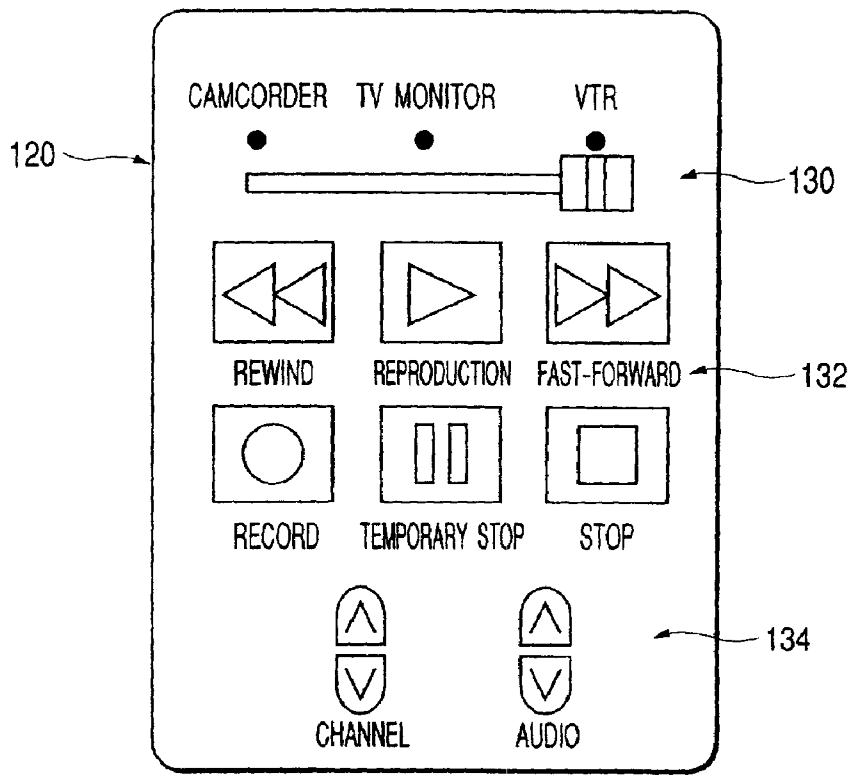
FIG. 10 is a diagram showing an example of a remote controller 120.

FIG. 10 is a diagram showing an example of the remote controller 120. A switch 130 is used to specify a target to be controlled. In this example, the remote controller 120 can select one of the TV monitor 110, the VTR 112 and the camcorder 114 as the controlled target. VTR operation keys 132 are commonly used to operate VTR devices 112 and 114. Tuner operation keys 134 are commonly used to operate TV tuners for the TV monitor 110 and the VTR 112 to adjust the channel and volume.

Figure 11A:
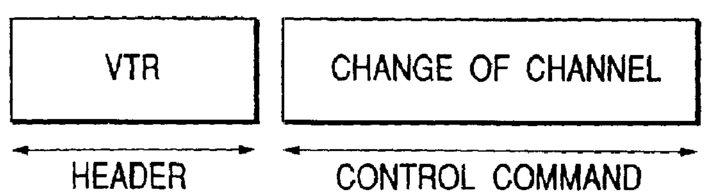
FIGS. 11A and 11B are diagrams for explaining examples of remote control signals output from the remote controller 120 when a user operates channel keys in tuner operation keys 134.
Figure 11B:
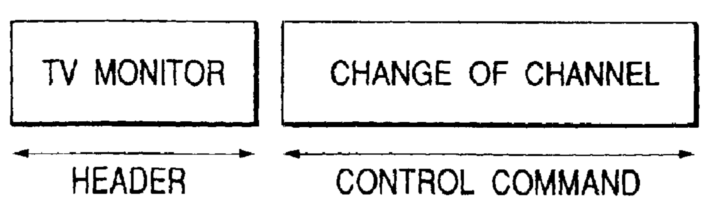

FIGS. 11A and 11B are diagrams for explaining examples of remote control signals output from the remote controller 120 when a user operates channel keys in the tuner operation keys 134. If the VTR 112 is selected by the switch 130, the remote controller 120 outputs a remote control signal (including a header that specifies the VTR 112 as the controlled target and control data that direct changes of channel as the controlled contents) as shown in FIG. 11A. If the TV monitor 110 is selected by the switch 130, the remote controller 120 outputs a remote control signal (including a header that specifies the TV monitor 110 as the controlled target and control data that direct changes of channel as the controlled contents) as shown in FIG. 11B.

Figure 12:
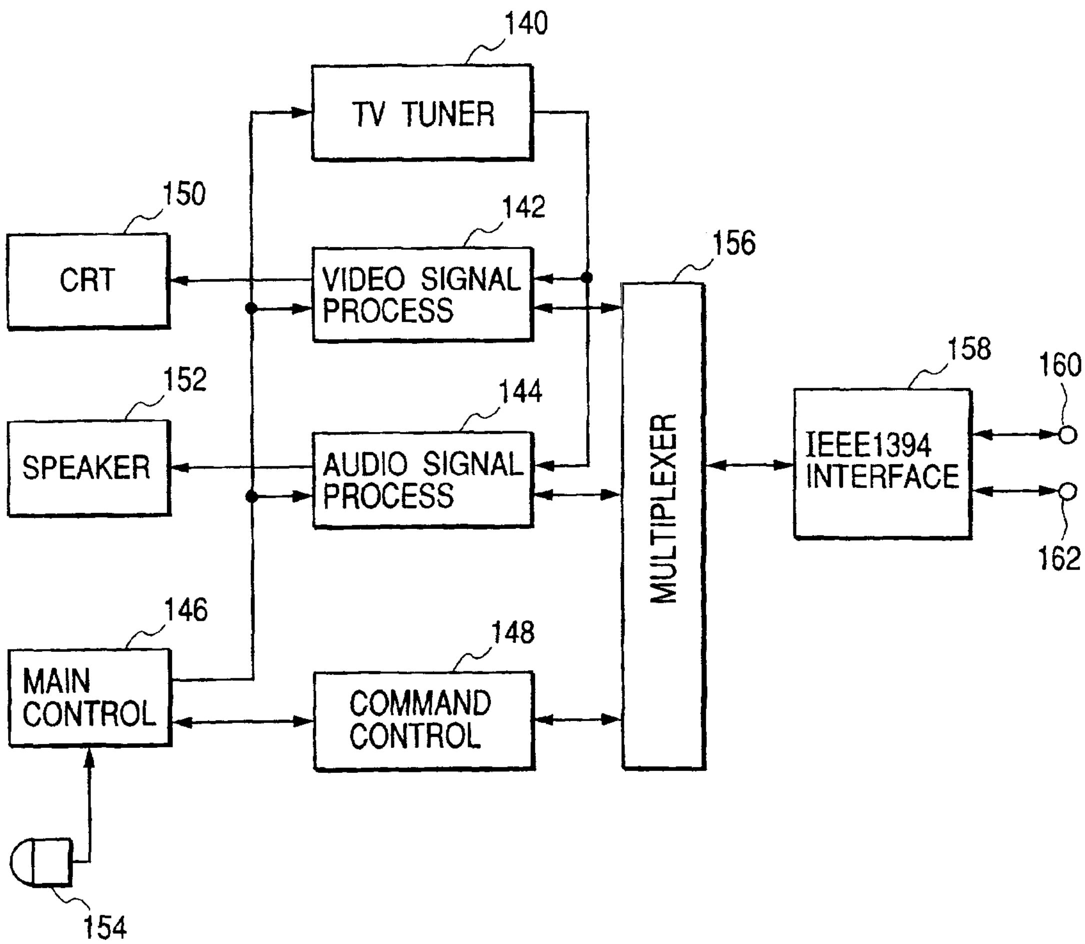
FIG. 12 is a block diagram for explaining major components of a TV monitor 110.

FIG. 12 is a block diagram for explaining an internal configuration of the TV monitor 110. The internal configuration includes a TV tuner 140, a video signal processing circuit 142, and an audio signal processing circuit 144. A main control circuit 146 (including a microcomputer) controls the entire system of the TV monitor 110 including the TV tuner 140, the video signal processing circuit 142 and the audio signal processing circuit 144. A command control circuit 148 processes control commands sent to or received from external equipment; it also communicates with the main control circuit 146.

A CRT 150 displays an image of a vide signal processed in the video signal processing circuit 142. A speaker 152 outputs a sound of an audio signal processed in the audio signal processing circuit 144. An infrared receiver 154 receives a remote control signal transmitted from the remote controller 120 and supplies the same to the main control circuit 146.

A multiplexer 156 performs time-division multiplexing and demultiplexing of a video signal packet, an audio signal packet and a command packet according to an IEEE 1394 communication protocol. A digital interface 158, which is based on the IEEE 1394-1995 standard and hereinbelow called the IEEE1394 interface, is equipped with terminals 160 and 162.

The configuration of the VTR 112 is identical to that of FIG. 4, while the configuration of the camcorder 114 is identical to that of FIG. 5. The terminal 160 of the TV monitor 110 is connected to the terminal of the VTR 112 through the IEEE 1394 cable 116, while the terminal 162 of the TV monitor 110 is connected to the terminal of the camcorder 114 through the IEEE 1394 cable 118.

Figure 13:
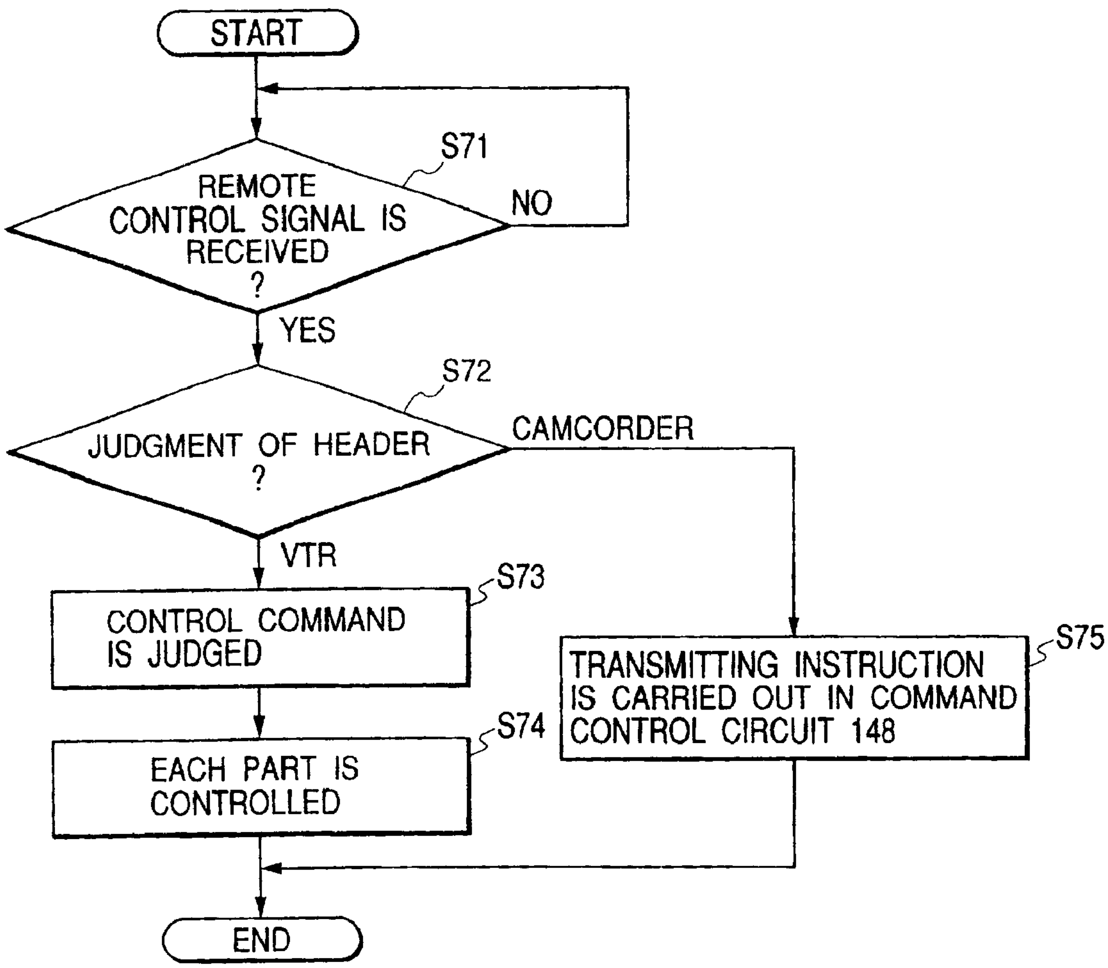
FIG. 13 is a flowchart for explaining the major operation of a main control circuit 146.

FIG. 13 is a flowchart for explaining the major operation of the main control circuit 146. The main control circuit 146 monitors an output signal from the infrared receiver 154 and stands by until a remote control signal is received (S71). Upon receipt of the remote control signal from the remote controller 120, the main control circuit 146 judges the header included in the remote control signal as to whether the controlled target is itself (i.e., the TV monitor 110) or other equipment (i.e., the VTR 112 or the camcorder 114) (S72). If the controlled target is itself (S72), the main control circuit 146 judges the contents of a control command (S73) and controls each component to operate according to the contents of the control command (S74). On the other hand, if the controlled target is other equipment (S72), the main control circuit 146 commands the command control circuit 148 to transmit the control command to the controlled target through the IEEE 1394 interface 158 (S75).

Figure 14:
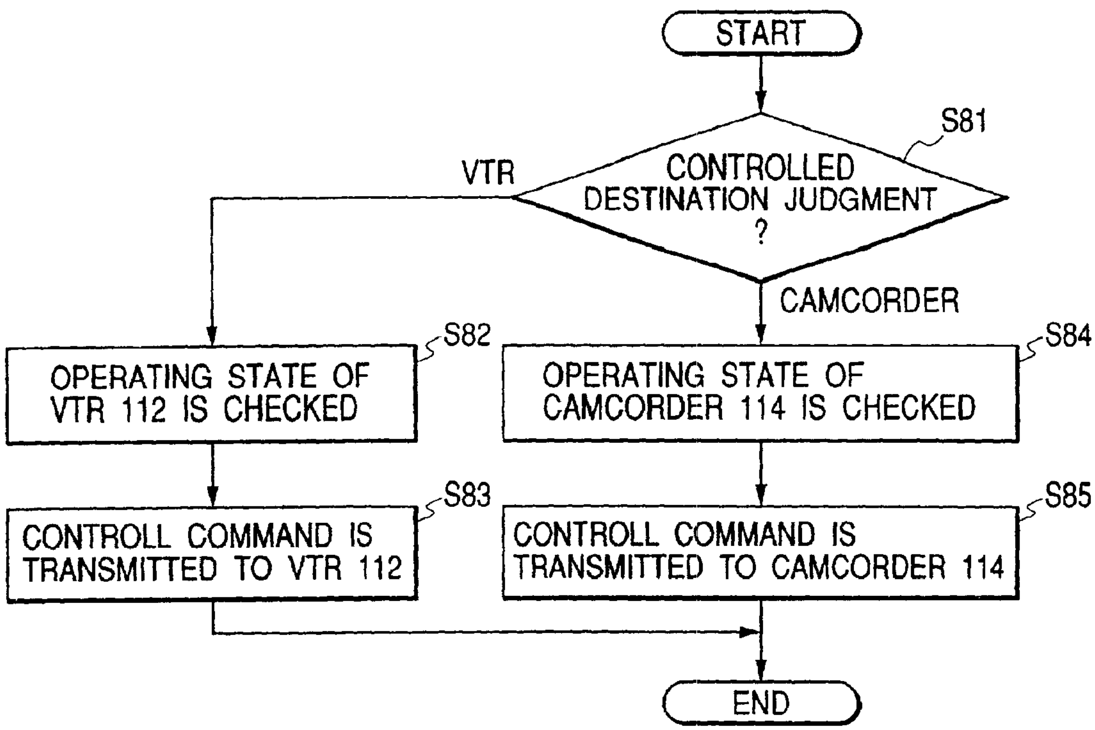
FIG. 14 is a flowchart for explaining the major operation of a command control circuit 148.

FIG. 14 is a flowchart for explaining the operation of the command control circuit 148. The command control circuit 148 first judges the controlled target (S81). If the controlled target is the VTR 112 (S81), the command control circuit 148 checks an operating state of the VTR 112 (S82). If it is judged from the checked operating state that the control command can be transmitted to the VTR 112, the command control circuit 148 transmits the control command to the VTR 112 (S83). If the controlled target is the camcorder 114 (S81), the command control circuit 148 checks an operating state of the camcorder 114 (S84). If it is judged from the checked operating state that the control command can be transmitted to the camcorder 114, the command control circuit 148 transmits the control command to the camcorder 114 (S85).

Upon receipt of the control command, the VTR 112 or the camcorder 114 changes its operating state according to the control command transmitted from the TV monitor 110.

As described above, according to the second embodiment, the TV monitor 110 judges a controlled target on the basis of the header information of the remote control signal transmitted from the remote controller 120. If the controlled target is itself, the TV monitor 110 operates according to the control command of the remote control signal. If the controlled target is other equipment, the TV monitor 110 forwards to the equipment the control command of the remote control signal. Such a configuration makes it easy for a user to remotely operate two or more pieces of equipment using the single remote controller 120.

Third Embodiment

Figure 15:
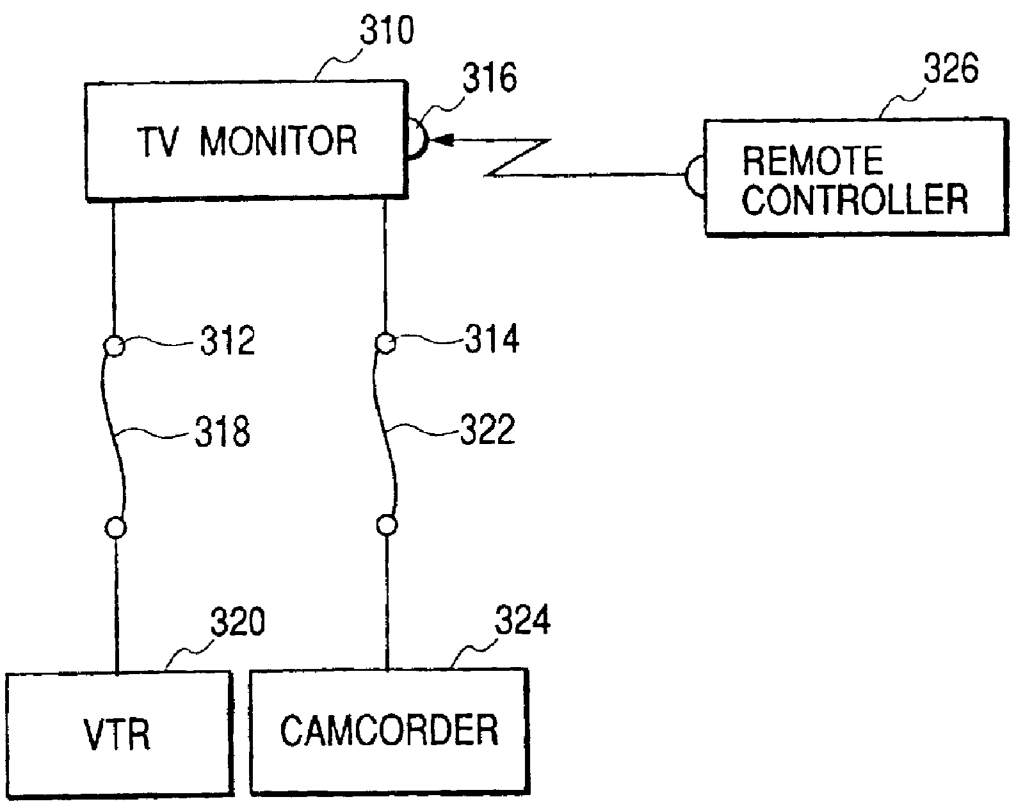
FIG. 15 is a block diagram for explaining a configuration of a remote control system according to a third embodiment.

FIG. 15 is a block diagram for explaining a configuration of a remote control system according to the third embodiment. As shown, a TV monitor 310 is provided with a digital interface having two terminals 312 and 314, and an infrared receiver 316, which receives a remote control signal. The terminal 312 is connected to a digital videotape recorder (hereinbelow, called the VTR) 320 through an IEEE 1394 cable 318, while the terminal 314 is connected to a digital video camera-recorder combination (hereinbelow, called the camcorder) 324 through an IEEE 1394 cable 322. A remote controller 326 outputs remote control signals to remotely operate the TV monitor 310, the VTR 320 and the camcorder 324.

According to the third embodiment, the TV monitor 310, the VTR 320 and the camcorder 324 are provided with digital interfaces, all of which are based on the IEEE 1394-1995 standard and connected to one another through IEEE 1394 cables 318 and 322.

Figure 16:
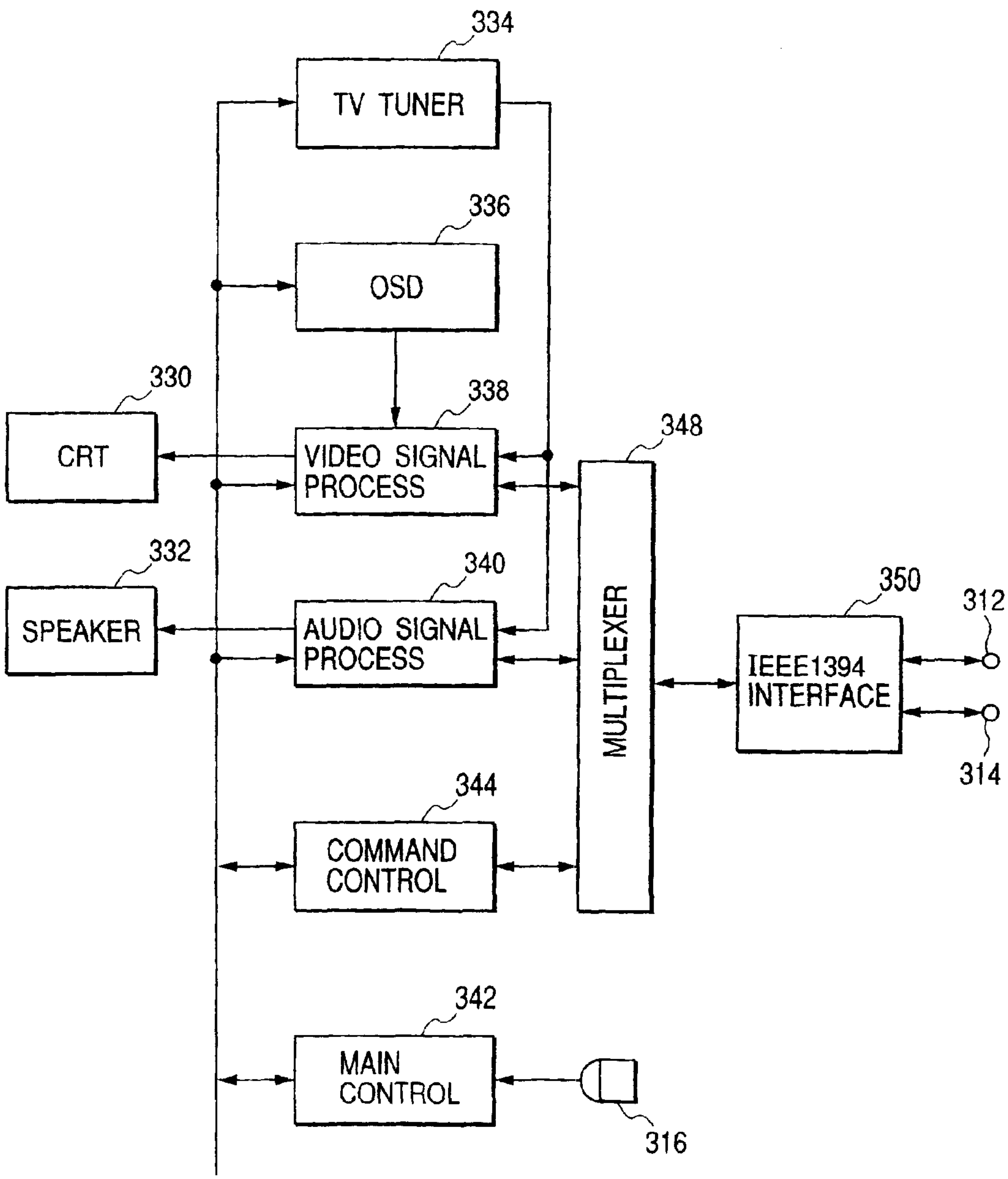
FIG. 16 is a block diagram for explaining major components of a TV monitor 310.

FIG. 16 is a block diagram for explaining major components of the TV monitor 310. The TV monitor 310 includes a CRT 330, a speaker 332, a TV tuner 334, an on-screen display circuit 336, a video signal processing circuit 338, and an audio signal processing circuit 340. A main control circuit 342 (including a microcomputer) controls the entire system of the TV monitor 310 including the TV tuner 334, the on-screen display circuit 336, the video signal processing circuit 338 and the audio signal processing circuit 340. A command control circuit 344 processes control commands sent to or received from external equipment; it also communicates with the main control circuit 342. The infrared receiver 316 receives a remote control signal transmitted from the remote controller 326 and supplies the same to the main control circuit 342.

A multiplexer 348 performs time-division demultiplexing of a video signal packet, an audio signal packet and a command packet according to an IEEE 1394 communication protocol (in this case, the only function of the multiplexer 348 is demultiplexing because the TV monitor 310 just receives these packets). A digital interface 350, which is based on the IEEE 1394-1995 standard and hereinbelow called the IEEE1394 interface, is equipped with terminals 312 and 1314.

Figure 17:
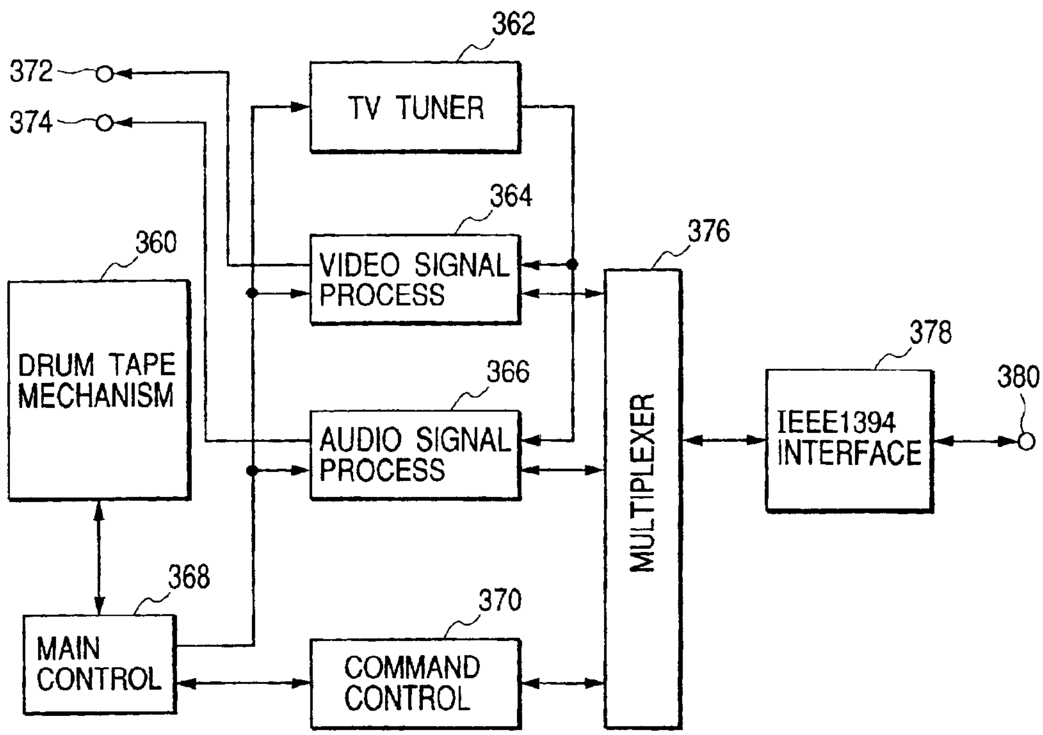
FIG. 17 is a block diagram for explaining major components of a VTR 320.

FIG. 17 is a block diagram for explaining major components of the VTR 320. The major components include a drum-tape mechanism 360 for a rotary drum and a magnetic tape, a TV tuner 362, a video signal processing circuit 364, and an audio signal processing circuit 366. A main control circuit 368 (including a microcomputer) controls the entire system of the VTR 320 including the drum-tape mechanism 360, the TV tuner 362, the video signal processing circuit 364 and the audio signal processing circuit 366. A command control circuit 370 processes control commands sent to or received from external equipment; it also communicates with the main control circuit 368.

Reference numeral 372 denotes an output terminal from which a video signal processed in the video signal processing circuit 364 is output. Reference numeral 374 denotes an output terminal from which an audio signal processed in the audio signal processing circuit 366 is output. A multiplexer 376 performs time-division multiplexing and demultiplexing of a video signal packet, an audio signal packet and a command packet according to an IEEE 1394 communication protocol. A digital interface 378, which is based on the IEEE 1394-1995 standard and hereinbelow called the IEEE1394 interface, is equipped with a terminal 380.

Figure 18:
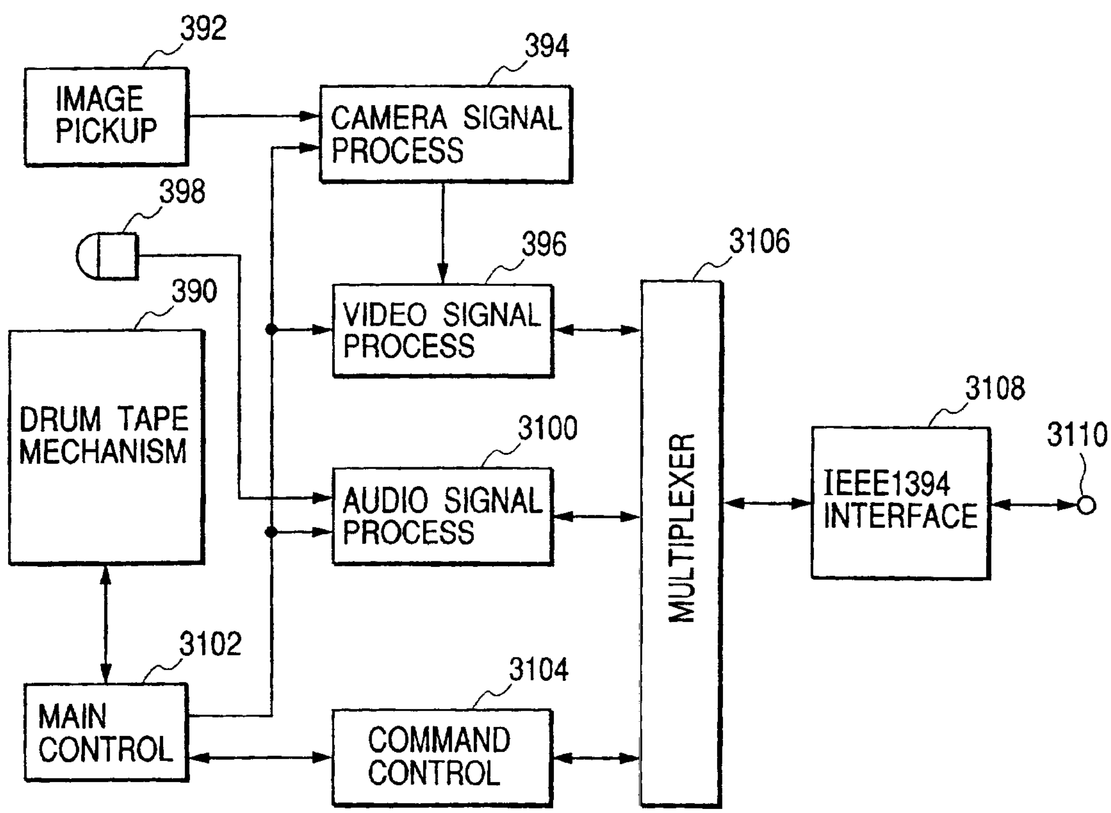
FIG. 18 is a block diagram for explaining major components of a camcorder 324.

FIG. 18 is a block diagram for explaining major components of the camcorder 324. The major components include: a drum-tape mechanism 390 for a rotary drum and a magnetic tape; an image pickup part 392, which is composed of a taking lens and an image pickup device; a camera signal processing circuit 394, which processes an image signal output from the image pickup part 392; a video signal processing circuit 396; a microphone 398; and an audio signal processing circuit 3100. A main control circuit 3102 (including a microcomputer) controls the entire system of the camcorder 324 including the drum-tape mechanism 390, the camera signal processing circuit 394, the video signal processing circuit 396 and the audio signal processing circuit 3100. A command control circuit 3104 processes control commands sent to or received from external equipment; it also communicates with the main control circuit 3102.

A multiplexer 3106 performs time-division multiplexing and demultiplexing of a video signal packet, an audio signal packet and a command packet according to an IEEE 1394 communication protocol. A digital interface 3108, which is based on the IEEE 1394-1995 standard and hereinbelow called the IEEE1394 interface, is equipped with a terminal 3110.

The terminal 380 shown in FIG. 17 is connected to the terminal 312 of the TV monitor 310 through the IEEE 1394 cable 318. On the other hand, the terminal 3110 shown in FIG. 18 is connected to the terminal 314 of the TV monitor 310 through the IEEE 1934 cable 322. Thus the TV monitor 310, the VTR 320 and the camcorder 324 can communicate with one another to exchange video signals, audio signals and control commands.

Figure 19:
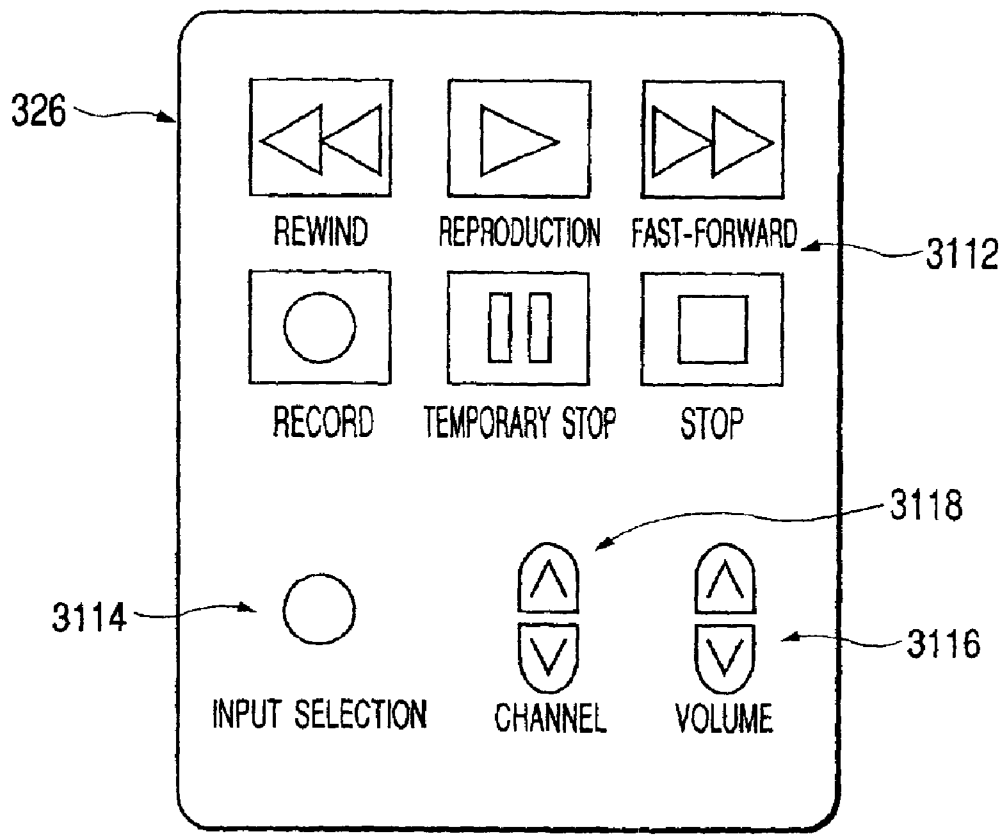
FIG. 19 is a diagram showing an example of a remote controller 326.

FIG. 19 is a diagram showing an example of the remote controller 326. VTR operation keys 3112 are commonly used to input VTR operations to the VTR 320 and the camcorder 324. An input select key 3114 is used to select a video source from which a video images to be displayed on the CRT 330 of the TV monitor 310 is supplied. Volume operation keys 3116 are used to adjust the volume of the TV monitor 310, while channel change keys 3118 are used to change the channel of the TV tuner 334 provided in the TV monitor 310 or the TV tuner 362 provided in the VTR 320.

Figure 20:
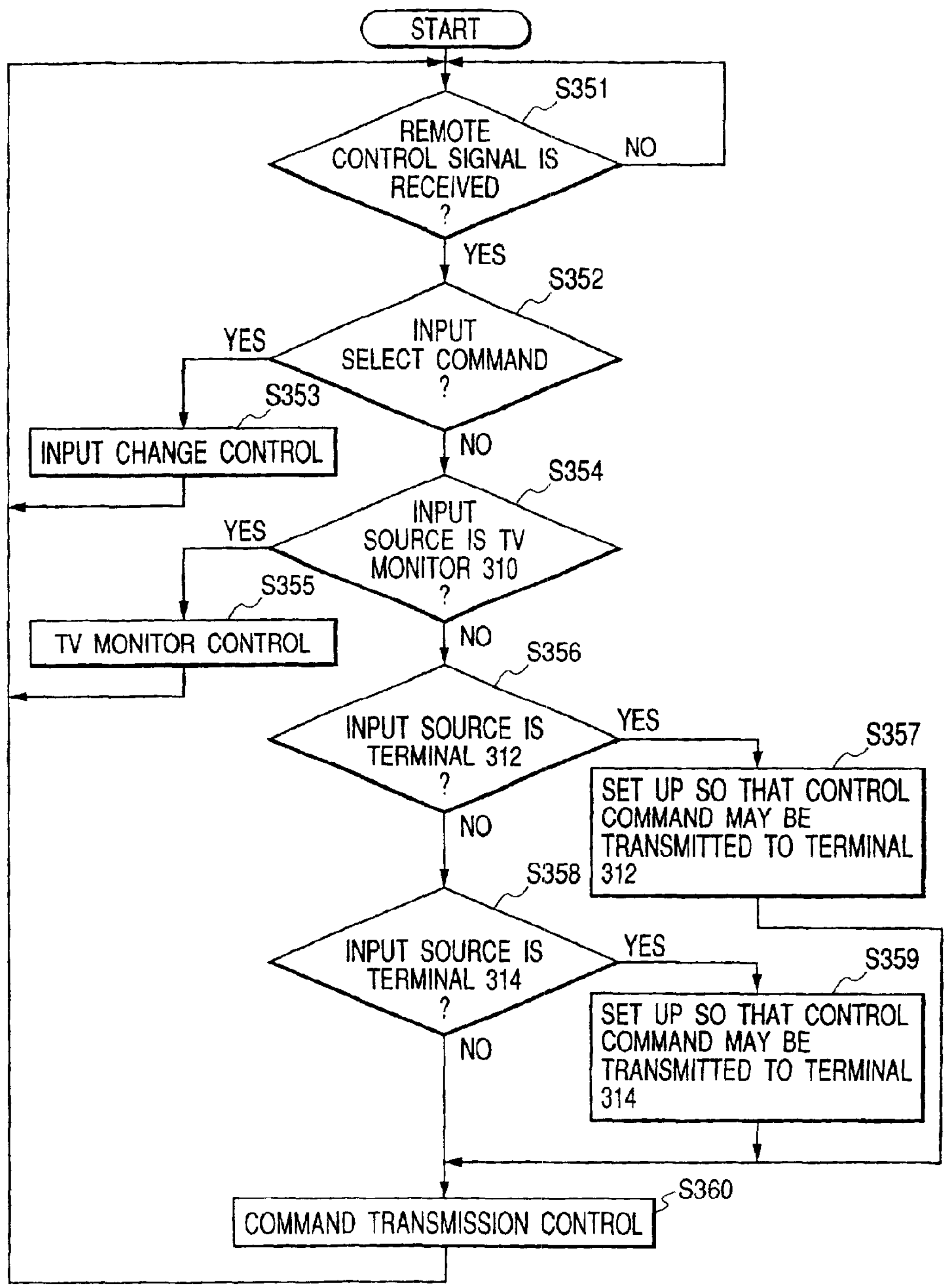
FIG. 20 is a flowchart for explaining the major operation of a main control circuit 342.

FIG. 20 is a flowchart for explaining the major operation of the main control circuit 342. When a user wants to change the input source of the TV tuner 334, the user operates the input select key 3114 of the remote controller 326. Pressing the input select key 3114 causes a remote control signal including an input select command to be generated and output (in this case, the remote control signal doesn't include header information for specifying a controlled target). The infrared receiver 316 receives the remote control signal output from the remote controller 326 and supplies the same to the main control circuit 342.

The main control circuit 342 judges whether or not the infrared receiver 316 receives the remote control signal (S351).

If the remote control signal received is an input select command (S352), the main control circuit 342 changes the input source (S353). Upon receipt of the input select command, if the input source is the terminal 312, the main control circuit 342 changes the input source to the terminal 314. On the other hand, if the input source is the terminal 314, the main control circuit 342 changes the input source to the TV tuner 334. In other words, the TV monitor 310 performs circulating selection of the TV tuner 334, the terminal 312 and the terminal 314 as the input source each time the input select key 3114 is pushed. Then a video signal from the newly selected input source is displayed on the CRT 330, while an audio signal therefrom is output from the speaker 332.

If the channel select key 3118 (or the volume adjust key 3116) of the remote controller 326 is operated in such condition that the input source is the TV tuner 334, a remote control signal including a channel select command (or a volume adjust command) is transmitted from the remote controller 326 to the TV monitor 310 (S354). Then the main control circuit 342 of the TV monitor 310 changes the receiving channel of the TV tuner 334 (or adjusts the volume of the speaker 332) according to the remote control signal transmitted from the remote controller 326. In other words, if the TV tuner 334 is the input source, the main control circuit 342 controls the operation of the TV monitor as the controlled target according to the control command included in the remote control signal.

If the VTR operation keys 3112 of the remote controller 326 are operated in such condition that the terminal 312 is the input source, a remote control signal including a VTR operation command is transmitted from the remote controller 326 to the TV monitor 310 (S356). Upon receipt of the remote control signal, the main control circuit 342 of the TV monitor 310 detects the VTR operation command from the remote control signal. Then the main control circuit 342 controls the transmission of the VTR operation command to the VTR 320 connected to the terminal 312 (S357). In other words, if the terminal 312 is the input source, the main control circuit 342 selects the electronic equipment (i.e., the VTR 320) connected to the terminal 312 as the controlled target. Then the main control circuit 342 controls the transmission of the control command included in the remote control signal to the electronic equipment (i.e., the VTR 320) connected to the terminal 312.

If the VTR operation keys 3112 of the remote controller 326 are operated such condition that the terminal 314 is the input source, a remote control signal including a VTR operation command is transmitted from the remote controller 326 to the TV monitor 310 (S358). Upon receipt of the remote control signal, the main control circuit 342 of the TV monitor 310 detects the VTR operation command from the remote control signal. Then the main control circuit 342 controls the transmission of the VTR operation command to the camcorder 324 connected to the terminal 314 (S359). In other words, if the terminal 314 is the input source, the main control circuit 342 selects the electronic equipment (i.e., the camcorder 324) connected to the terminal 314 as the controlled target. Then the main control circuit 342 controls the transmission of the control command included in the remote control signal to the electronic equipment (i.e., the camcorder 324) connected to the terminal 314.

Figure 21:
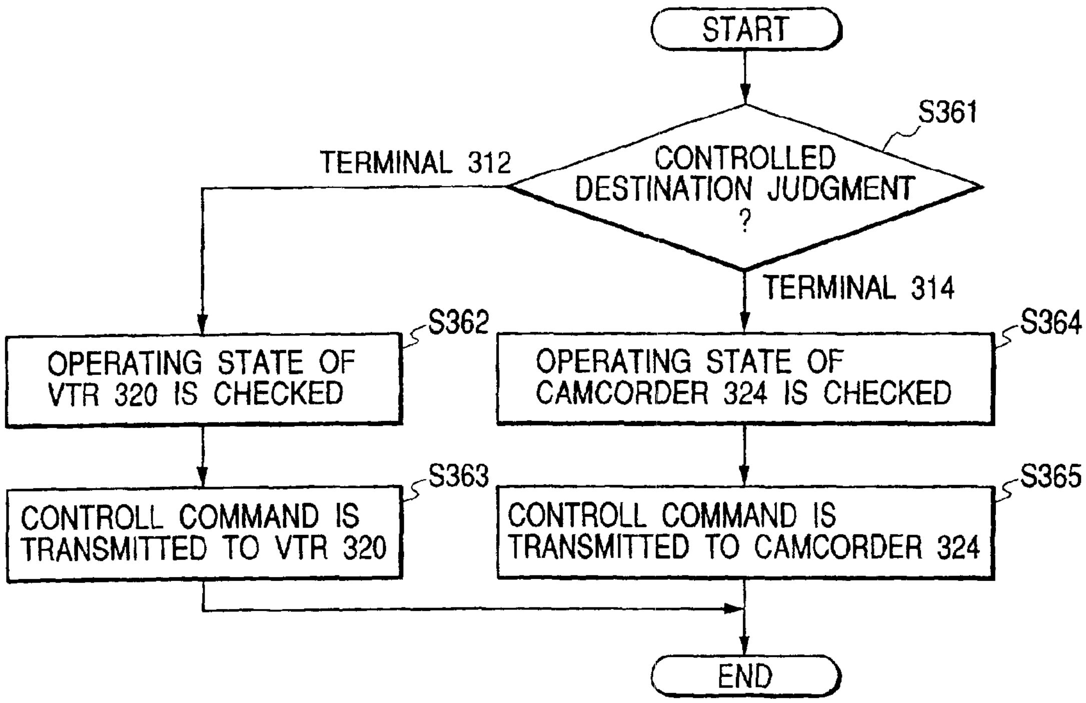
FIG. 21 is a flowchart for explaining the operation of a command control circuit 344 executed in step S360 of FIG. 20.

FIG. 21 is a flowchart for explaining the operation of the command control circuit 344 executed in step S360 of FIG. 20. The command control circuit 344 first judges an input source as the controlled target (i.e., the destination of the control command) (S361). If the input source is the terminal 312, the command control circuit 344 checks an operating state of the electronic equipment (i.e., the VTR 320) connected to the terminal 312 (S362). Then the command control circuit 344 transmits the control command from the terminal 312 to the VTR 320 as commanded by the main control circuit 342 (S363). If the input source is the terminal 314, the command control circuit 344 checks an operating state of the electronic equipment (i.e., the camcorder 324) connected to the terminal 314 (S364). Then the command control circuit 344 transmits the control command from the terminal 314 to the camcorder 324 as commanded by the main control circuit 342 (S365). The VTR 320 or the camcorder 324 changes its operating mode according to the command transmitted from the TV monitor 310.

Figure 22:
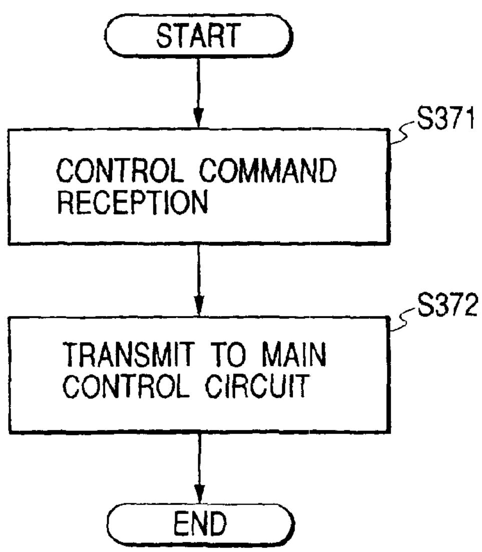
FIG. 22 is a flowchart for explaining the operation of the VTR 320 and the camcorder 324.

FIG. 22 is a flowchart showing an operation flow of the VTR 320 and the camcorder 324 in response to the transmission of commands from the TV monitor. The command control circuits 370 and 3104 receive control commands from the TV monitor 310 through the IEEE 1394 interfaces 380 and 3110 (S371), and transmit the commands to the main control circuits 368 and 3102, respectively (S372). The main control circuits 368 and 3102 control each component according to the contents of the respective commands received. Thus the VTR 320 or the camcorder 324 can operate according to user's VTR operations on the remote controller 326.

The following describes a case where the channel select keys 3118 are operated in such condition that the input source is the terminal 312. As in the case of the operations of the VTR operation keys 3112, the main control circuit 342 selects the electronic equipment (i.e., the VTR 320) connected to the terminal 312 as the controlled target. Then the main control circuit 342 controls the transmission of a channel select command included in the remote control signal to the electronic equipment (i.e., the VTR 320) connected to the terminal 312.

Figure 23:
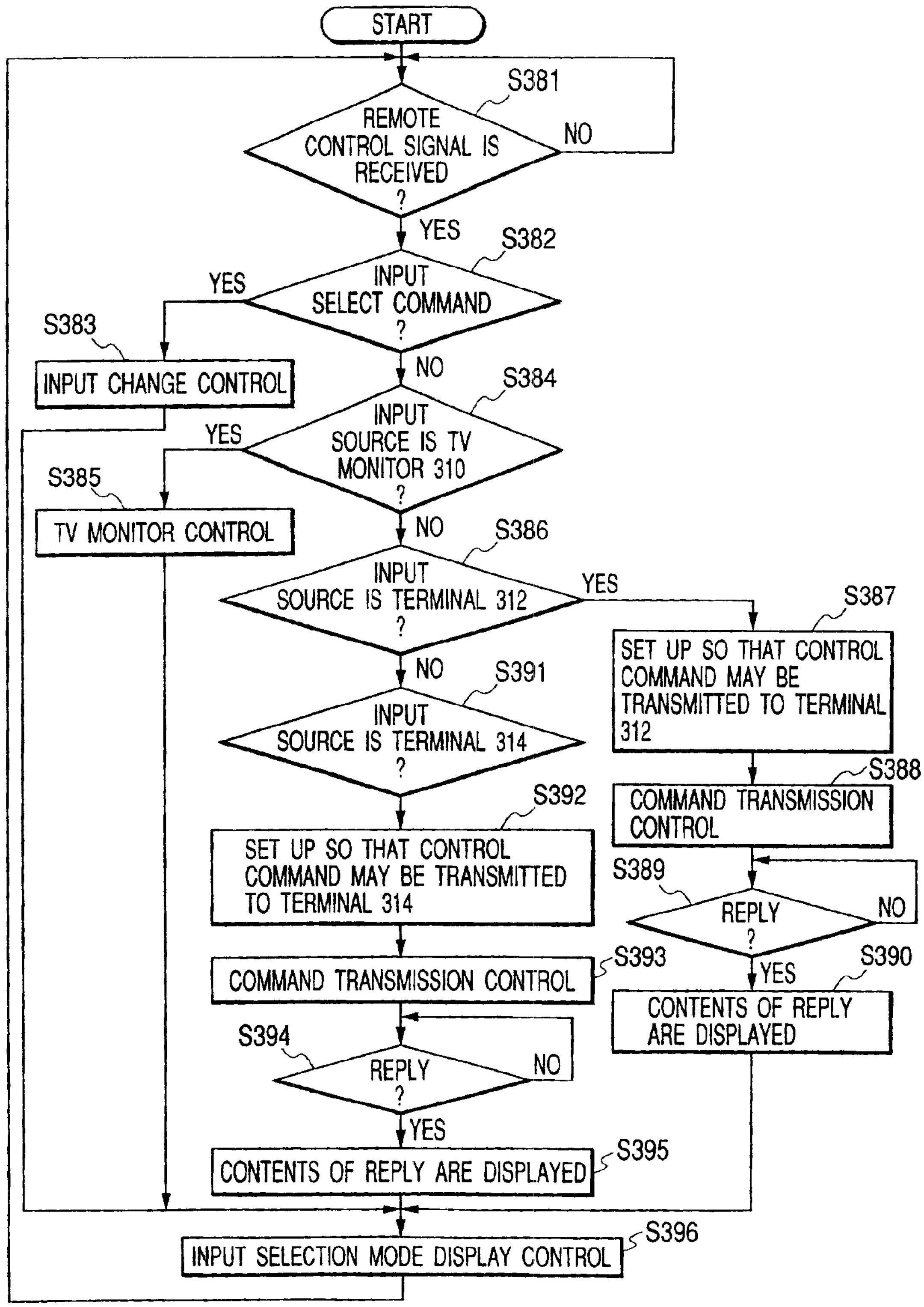
FIG. 23 is a flowchart for explaining another example of the major operation of the main control circuit 342.
Figure 24:
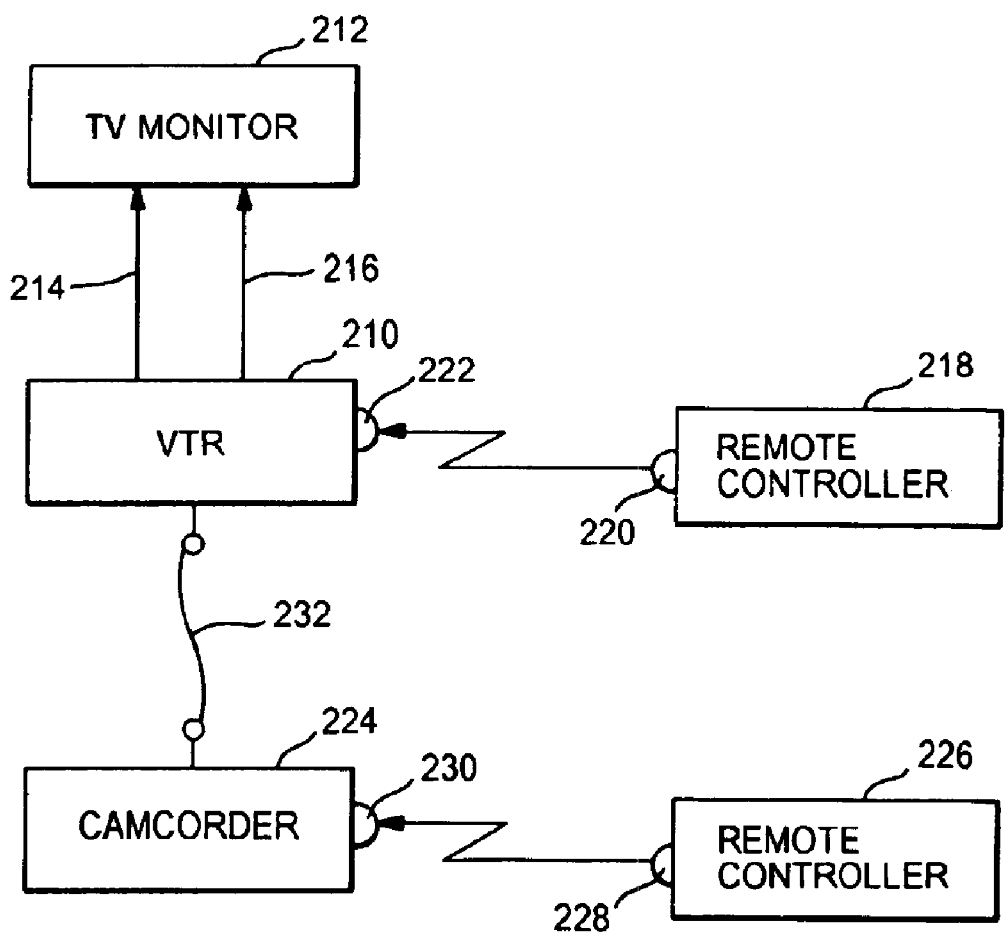
FIG. 24 is a block diagram for explaining a configuration of a conventional remote control system.

FIG. 23 is a flowchart for explaining another example of the major processing procedure of the TV monitor 310.

Operations of step S381 to step S385 are identical to those of step S351 to step S355 in FIG. 20, and the description thereof will be omitted.

If the VTR operation keys 3112 are operated in such condition that the input source is the terminal 312, a remote control signal including a VTR operation command is transmitted from the remote controller 326 to the TV monitor 310 (S386). The main control circuit 342 of the TV monitor 310 detects the VTR operation command from the remote control signal, and controls the transmission of the VTR operation command to the VTR 320 connected to the terminal 312 (S387). Then the command control circuit 344 transmits the VTR operation command to the electronic equipment (i.e., the VTR 320) connected to the terminal 312 (S388).

The VTR 320 controls its operation according to the control command transmitted from the TV monitor 310, and transmits the resulting operation to the TV monitor 310. The command control circuit 344 waits for reply data from the VTR 320 (S389), and upon receiving, it supplies the replay data to the main control circuit 342. The main control circuit 342 displays the operating state of the VTR 320 on the screen of the CRT 330 through the on-screen circuit 336 (S390). Thus the use can check on the screen of the TV monitor 310 as to whether or not the VTR 320 has normally received the remote control signal.

If the VTR operation keys 3112 of the remote controller 326 are operated in such condition that the terminal 314 is the input source, the main control circuit 342 executes basically the same operations as in the case of the terminal 312 as the input source (S391 to S395).

After the completion of steps S383, S385, S390 and S395, the current input source is displayed on the screen of the TV monitor 310 for a specific time period while waiting for the next remote control signal (S396).

As described above, the third embodiment makes it easy for the user to use the signal remote controller 326 for remote operations of the TV monitor 310 and two or more video sources (i.e., the VTR 320 and the camcorder 324) connected to the TV monitor 310. Further, since the user doesn't need to be aware which video source is selected by the TV monitor 310, the usability of the remote control system is greatly enhanced.

Furthermore, since the result of the remote operation to the video source is displayed on the screen of the TV monitor 310, the user can easily check the result of the remote operation.

The invention may be embodied in other specific forms without departing from essential characteristics thereof.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A control system comprising:

a remote control apparatus; and a controlled apparatus controlled by the remote control apparatus;

wherein the controlled apparatus includes a receiving unit adapted to receive a remote control signal transmitted from the remote control apparatus, a control unit adapted to select the controlled apparatus or a second controlled apparatus according to the remote control signal, and a transmitting unit adapted to transmit a control command corresponding to the remote control signal to the second controlled apparatus if the second controlled apparatus is selected by the control unit, wherein the control unit is adapted to check an operating state of the second controlled apparatus before the control command is transmitted to the second controlled apparatus, and to control the controlled apparatus according to the remote control signal if the controlled apparatus is selected by the control unit.

2. A control system according to claim 1, wherein the remote control apparatus has a selector adapted to select a destination of the control command.

3. A control system according to claim 1, wherein the remote control signal has information indicating a destination of the control command.

4. A control system according to claim 1, wherein the controlled apparatus is an apparatus having a video recorder.

5. A control system according to claim 1, wherein the controlled apparatus is an apparatus having a TV monitor.

6. A control method for controlling a controlled apparatus which is controlled by a remote control signal, the method comprising the steps of:

receiving the remote control signal transmitted from a remote control apparatus;

selecting the controlled apparatus or a second controlled apparatus according to the remote control signal;

transmitting a control command corresponding to the remote control signal to the second controlled apparatus if the second controlled apparatus is selected in the selecting step;

checking an operating state of the second controlled apparatus before the control command is transmitted to the second controlled apparatus; and controlling the controlled apparatus according to the remote control signal if the controlled apparatus is selected in the selecting step.

7. A control method according to claim 6, wherein the remote control apparatus has a selector adapted to select a destination of the control command.

8. A control method according to claim 6, wherein the remote control signal has information indicating a destination of the control command.

9. A control method according to claim 6, wherein the controlled apparatus is an apparatus having a video recorder.

10. A control method according to claim 6, wherein the controlled apparatus is an apparatus having a TV monitor.

11. A controlled apparatus which is controlled by a remote control apparatus, the controlled apparatus comprising:

a receiving unit adapted to receive a remote control signal transmitted from the remote control apparatus;

a control unit adapted to select the controlled apparatus or a second controlled apparatus according to the remote control signal; and a transmitting unit adapted to transmit a control command corresponding to the remote control signal to the second controlled apparatus if the second controlled apparatus is selected by the control unit, wherein the control unit is adapted to check an operating state of the second controlled apparatus before the control command is transmitted to the second controlled apparatus, and to control the controlled apparatus according to the remote control signal if the controlled apparatus is selected by the control unit.

12. A controlled apparatus according to claim 11, wherein the remote control apparatus has a selector adapted to select a destination of the control command.

13. A controlled apparatus according to claim 11, wherein the remote control signal has information indicating a destination of the control command.

14. A controlled apparatus according to claim 11, wherein the controlled apparatus is an apparatus having a video recorder.

15. A controlled apparatus according to claim 11, wherein the controlled apparatus is an apparatus having a TV monitor.

* * * * *